US008352138B2

(12) United States Patent
Dahl et al.

(10) Patent No.: US 8,352,138 B2
(45) Date of Patent: Jan. 8, 2013

(54) DYNAMIC CONTROL SYSTEM FOR CONTINUOUSLY VARIABLE TRANSMISSION

(75) Inventors: Kristofor Lee Dahl, Yorkville, IL (US); Richard George Ingram, St. Charles, IL (US); Michael Anthony Spielman, Jr., Brookfield, IL (US); Alberto Martinez, Jr., Lisle, IL (US); Yaang Zhao, Surrey (CA); Ellen Jean Hoffman, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1439 days.

(21) Appl. No.: 11/987,520

(22) Filed: Nov. 30, 2007

(65) Prior Publication Data

US 2009/0143948 A1    Jun. 4, 2009

(51) Int. Cl.
  *F16H 61/66* (2006.01)
  *F16H 59/06* (2006.01)
  *B60K 23/00* (2006.01)
(52) U.S. Cl. ....................................................... 701/56
(58) Field of Classification Search ...................... 701/56
  See application file for complete search history.

(56) References Cited

U.S. PATENT DOCUMENTS

| | | |
|---|---|---|
| 3,823,792 A | 7/1974 | Dinkloh et al. |
| 4,125,797 A | 11/1978 | Bader et al. |
| 4,152,951 A | 5/1979 | Korczykowski |
| 4,720,793 A | 1/1988 | Watanabe et al. |
| 4,793,217 A | 12/1988 | Morisawa et al. |
| 4,850,250 A | 7/1989 | Nehmer et al. |
| 4,864,894 A | 9/1989 | Falzoni |
| 4,989,474 A | 2/1991 | Cicotte et al. |
| 5,040,648 A | 8/1991 | Mitchell et al. |
| 5,078,024 A | 1/1992 | Cicotte et al. |
| 5,086,865 A | 2/1992 | Tanaka et al. |
| 5,142,928 A | 9/1992 | Buti et al. |

(Continued)

FOREIGN PATENT DOCUMENTS

EP    1493609 A1    1/2005

(Continued)

OTHER PUBLICATIONS

Michael G. Cronin, et al., "Operator Interface for Torque Controlled Transmission," U.S. Appl. No. 11/589,750, filed Oct. 31, 2006, 27 pages.

(Continued)

*Primary Examiner* — Shelley Chen
(74) *Attorney, Agent, or Firm* — Finnegan, Henderson, Farabow, Garrett & Dunner LLP (57) ABSTRACT

A continuously variable transmission is provided having a driven element. The continuously variable transmission also has a first operator input device configured to transmit a first displacement signal corresponding to a displacement of the first operator input device. The continuously variable transmission further has a second operator input device configured to transmit a second displacement signal corresponding to a displacement of the second operator input device. In addition, the continuously variable transmission has a third operator input device configured to transmit a transmission operating mode request. Furthermore, the continuously variable transmission has at least one sensor configured to sense at least one parameter indicative of an operating condition of the transmission. Additionally, the continuously variable transmission has a controller configured to determine a driven element output request based on the operating request mode, the first displacement signal, the second displacement signal, and the at least one sensed parameter. The controller is also configured to regulate an output of the driven element in response to the operating mode request, the driven element output request, and the at least one sensed parameter.

19 Claims, 8 Drawing Sheets

U.S. PATENT DOCUMENTS

| | | | |
|---|---|---|---|
| 5,521,819 | A | 5/1996 | Greenwood |
| 5,527,232 | A | 6/1996 | Seidel et al. |
| 5,553,453 | A | 9/1996 | Coutant et al. |
| 5,560,203 | A | 10/1996 | Pollman |
| 5,766,105 | A | 6/1998 | Fellows et al. |
| 5,775,784 | A | 7/1998 | Koga et al. |
| 5,846,156 | A | 12/1998 | Meissner et al. |
| 5,890,991 | A | 4/1999 | Sakakiyama |
| 5,915,801 | A | 6/1999 | Taga et al. |
| 5,924,955 | A | 7/1999 | Ishii et al. |
| 6,019,701 | A | 2/2000 | Mori et al. |
| 6,038,504 | A | 3/2000 | Cronin et al. |
| 6,157,884 | A | 12/2000 | Narita et al. |
| 6,161,071 | A | 12/2000 | Shuman et al. |
| 6,183,390 | B1 | 2/2001 | Koga et al. |
| 6,223,111 | B1 | 4/2001 | Cronin et al. |
| 6,247,378 | B1 | 6/2001 | Newendorp et al. |
| 6,314,357 | B1 | 11/2001 | Kon et al. |
| 6,350,216 | B1 | 2/2002 | Speicher et al. |
| 6,357,232 | B1 | 3/2002 | Strashny |
| 6,389,347 | B1 | 5/2002 | Nozaki |
| 6,492,785 | B1 | 12/2002 | Kasten et al. |
| 6,537,169 | B1 | 3/2003 | Morri |
| 6,551,212 | B2 | 4/2003 | Skinner et al. |
| 6,553,302 | B2 | 4/2003 | Goodnight et al. |
| 6,589,130 | B1 | 7/2003 | Baginski et al. |
| 6,622,075 | B1 | 9/2003 | Reuschel et al. |
| 6,633,805 | B2 | 10/2003 | Burgart et al. |
| 6,640,179 | B2 | 10/2003 | Katakura et al. |
| 6,671,602 | B1 | 12/2003 | Speicher et al. |
| 6,695,742 | B2 | 2/2004 | Hagiwara et al. |
| 6,766,231 | B2 | 7/2004 | Nakagawa et al. |
| 6,827,167 | B2 | 12/2004 | Cikanek et al. |
| 6,920,865 | B2 | 7/2005 | Lyon |
| 2002/0082138 | A1 | 6/2002 | Cannon et al. |
| 2004/0014557 | A1 | 1/2004 | Carlson et al. |
| 2004/0100145 | A1 | 5/2004 | Holt et al. |
| 2004/0129487 | A1 | 7/2004 | Shabana et al. |
| 2005/0103555 | A1 | 5/2005 | Cannon et al. |
| 2006/0032221 | A1 | 2/2006 | Fukasawa et al. |

FOREIGN PATENT DOCUMENTS

| | | |
|---|---|---|
| JP | 4019463 | 1/1992 |
| JP | 08338527 | 12/1996 |
| JP | 2002168339 | 6/2002 |
| JP | 2005126020 | 5/2005 |
| WO | WO2007/023138 A1 | 3/2007 |

OTHER PUBLICATIONS

Kristofor Lee Dahl et al., Torque-based Control System for a Continuously Variable Transmission, U.S. Appl. No. 11/905,194, filed Sep. 28, 2007, 21 pages.

Thomas M. Sopko et al., "System for Controlling a Machine with a Continuously Variable Transmission," U.S. Appl. No. 11/797,014, filed Apr. 30, 2007, 31 pages.

Norval P. Thomson et al., "A CVT System having Discrete Selectable Speed Ranges," U.S. Appl. No. 11/700,195, filed Jan. 31, 2007, 22 pages.

Patent Cooperation Treaty, International Preliminary Report on Patentability, Jun. 10, 2010, 5 pages, International Application No. PCT/US2008/013081, Authorized Officer: Nora Lindner.

Patent Cooperation Treaty, International Search Report, Mar. 2, 2009, 2 pages, International Application No. PCT/US2008/013081, Authorized Officer: Gerard Vogt-Schilb.

Notification of the First Office Action in Application No. 200880118196.7 dated Jun. 12, 2012, 9 pages.

DYNAMIC CONTROL SYSTEM FOR CONTINUOUSLY VARIABLE TRANSMISSION

TECHNICAL FIELD

The present disclosure is directed to a control system for a continuously variable transmission, and more particularly, to a dynamic control system for a continuously variable transmission.

BACKGROUND

Machines such as, for example, wheel loaders, dozers, backhoes, dump trucks, and other heavy equipment are used to perform many tasks. To effectively perform these tasks, the machines require an engine that provides significant torque through a transmission to one or more ground engaging devices. Often, these machines utilize continuously variable transmissions (CVT) for increased engine efficiency.

A CVT is an automatic type of transmission that provides an infinite number of output ratios within its ratio range. For example, a hydraulic CVT includes a pump and a fluid motor that receives pressurized fluid from the pump. Depending on a discharge flow rate and pressure of the pump, the motor speed and output torque at the ground engaging device may be varied. An electric CVT includes a generator and an electric motor that receives current from the generator. Depending on the current supplied to the motor, the motor speed and output torque may be varied.

An example of a system used to control a conventional CVT is described in U.S. Pat. No. 4,793,217 (the '217 patent) issued to Morisawa et al. on Dec. 27, 1988. The control system disclosed in the '217 patent is a speed based system that adjusts a speed of an input shaft of the CVT to maintain a target output. The CVT operates in a plurality of modes such as forward and reverse, wherein each operation mode has a unique map assigned to it. In addition, each map indicates a relationship between a target speed of the input shaft of the CVT and an engine output for the associated mode. When the CVT is actuated, a controller determines in which mode the CVT is operating and selects the map designed for that mode. The controller then adjusts the speed of the input shaft according to the map to attain the desired engine output.

Although the control system disclosed in the '217 patent may produce a desired engine output for a plurality of operating modes, the application of the system may be limited. In particular, because each input invokes only one map, there may be little variety in the types of maps available. Such a reduced variety may limit the diversity of tasks and environments in which the transmission and ultimately the associated machine may operate.

The disclosed apparatus is directed to overcoming one or more of the problems set forth above.

SUMMARY

In one aspect, the present disclosure is directed toward a continuously variable transmission including a driven element. The continuously variable transmission also includes a first operator input device configured to transmit a first displacement signal corresponding to a displacement of the first operator input device. The continuously variable transmission further includes a second operator input device configured to transmit a second displacement signal corresponding to a displacement of the second operator input device. In addition, the continuously variable transmission includes a third operator input device configured to transmit a transmission operating mode request. Furthermore, the continuously variable transmission includes at least one sensor configured to sense at least one parameter indicative of an operating condition of the transmission. Additionally, the continuously variable transmission includes a controller configured to determine a driven element output request based on the operating request mode, the first displacement signal, the second displacement signal, and the at least one sensed parameter. The controller is also configured to regulate an output of the driven element in response to the operating mode request, the driven element output request, and the at least one sensed parameter.

Consistent with another aspect of the disclosure, a method is provided for operating a transmission. The method includes receiving an operating mode request, receiving a first and a second operator input device displacement signal, and sensing at least one parameter indicative of an operating condition of the transmission. The method also includes determining a transmission output request in response to the operating mode request, the first operator input device displacement signal, the second operator input device displacement signal, and the at least one parameter. The method further includes controlling an output of the transmission in response to the operating mode request, the determined transmission output request, and the at least one parameter.

DETAILED DESCRIPTION

Figure 1:
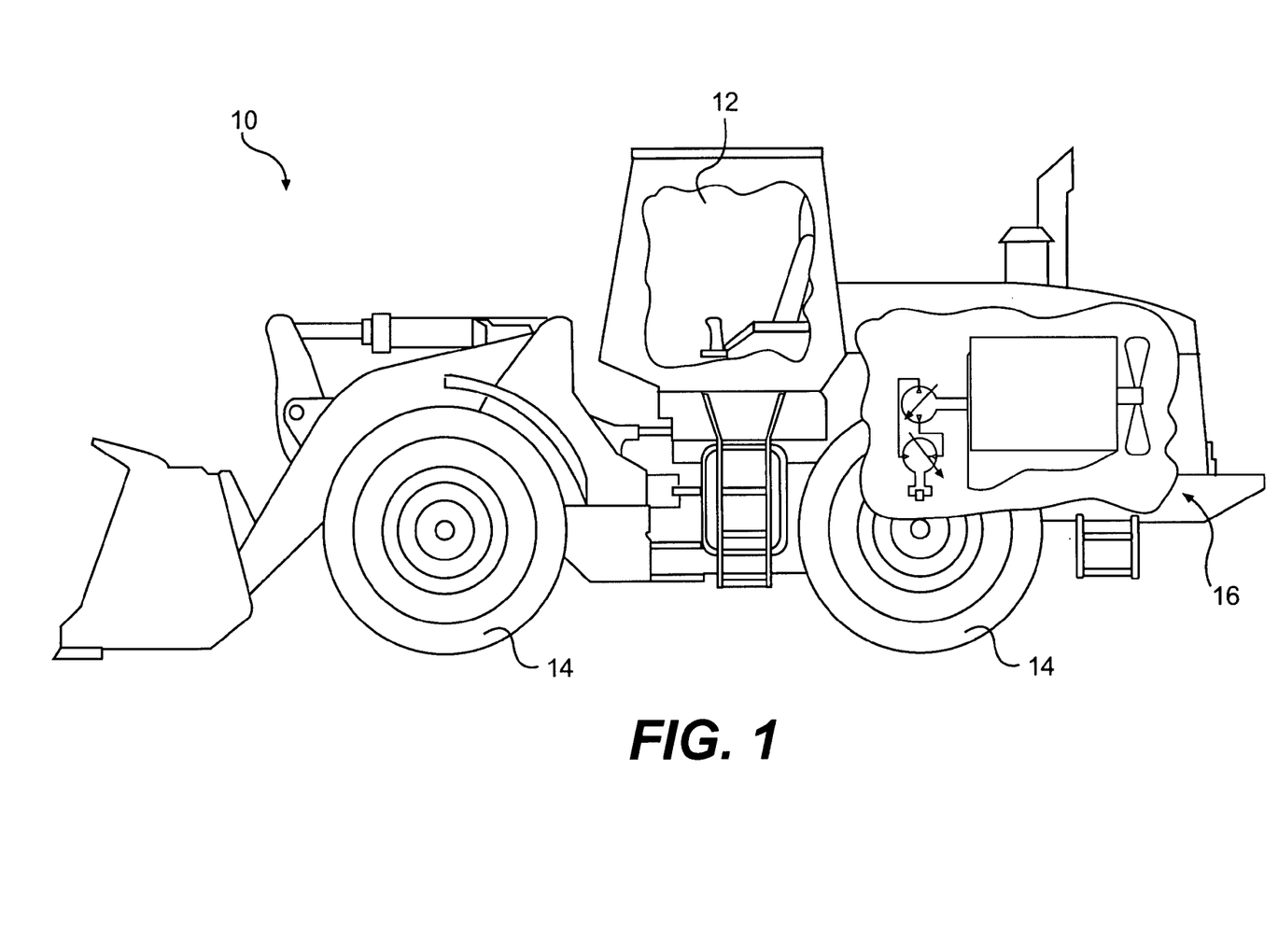
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the wheel loader depicted in FIG. 1, a bus, a highway haul truck, or any other type of mobile machine known in the art. Machine 10 may include an operator station 12, one or more traction devices 14, and a power train 16 operatively connected to drive at least one of traction devices 14.

Figure 2:
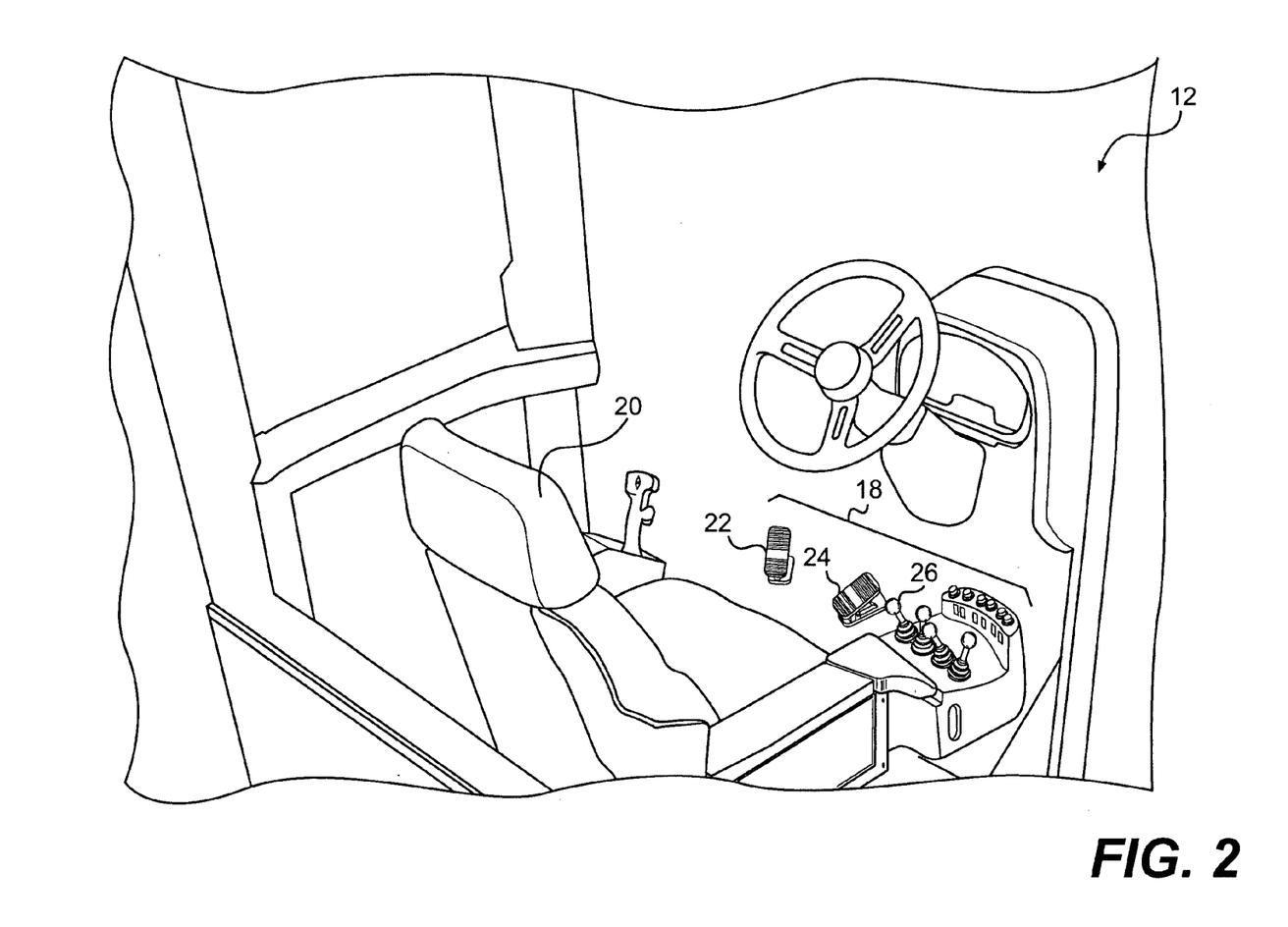
FIG. 2 is a pictorial illustration of an exemplary disclosed operator station for use with the machine of FIG. 1.

As illustrated in FIG. 2, operator station 12 may include devices that receive input from a machine operator indicative of a desired machine travel maneuver. Specifically, operator station 12 may include one or more operator interface devices 18 located proximate an operator seat 20. Operator interface devices 18 may initiate movement of machine 10 by producing displacement signals that are indicative of a desired machine maneuver. In one embodiment, operator interface devices 18 may include a left foot pedal 22, a right foot pedal 24, and a forward-neutral-reverse (FNR) selector 26. As an operator manipulates left foot pedal 22 and/or right foot pedal 24 (i.e., displaces left and/or right foot pedals 22 and 24 away from a neutral position), the operator may expect and affect a corresponding machine travel movement. In addition, as the operator moves FNR selector 26 to a forward, reverse, or neutral position, the operator may affect a corresponding transmission operating mode such as, for example, forward, reverse, or idle. It is contemplated that operator interface devices other than foot pedals such as, for example, joysticks, levers, switches, knobs, wheels, and other devices known in the art, may additionally or alternatively be provided within operator station 12 for travel control of machine 10, if desired. Furthermore, FNR selector 26 may be omitted and other operator input devices may affect the transmission operating mode.

Traction devices 14 (referring to FIG. 1) may embody wheels located on each side of machine 10 (only one side shown). Alternatively, traction devices 14 may include tracks, belts or other known traction devices. It is contemplated that any combination of the wheels on machine 10 may be driven and/or steered.

Figure 3:
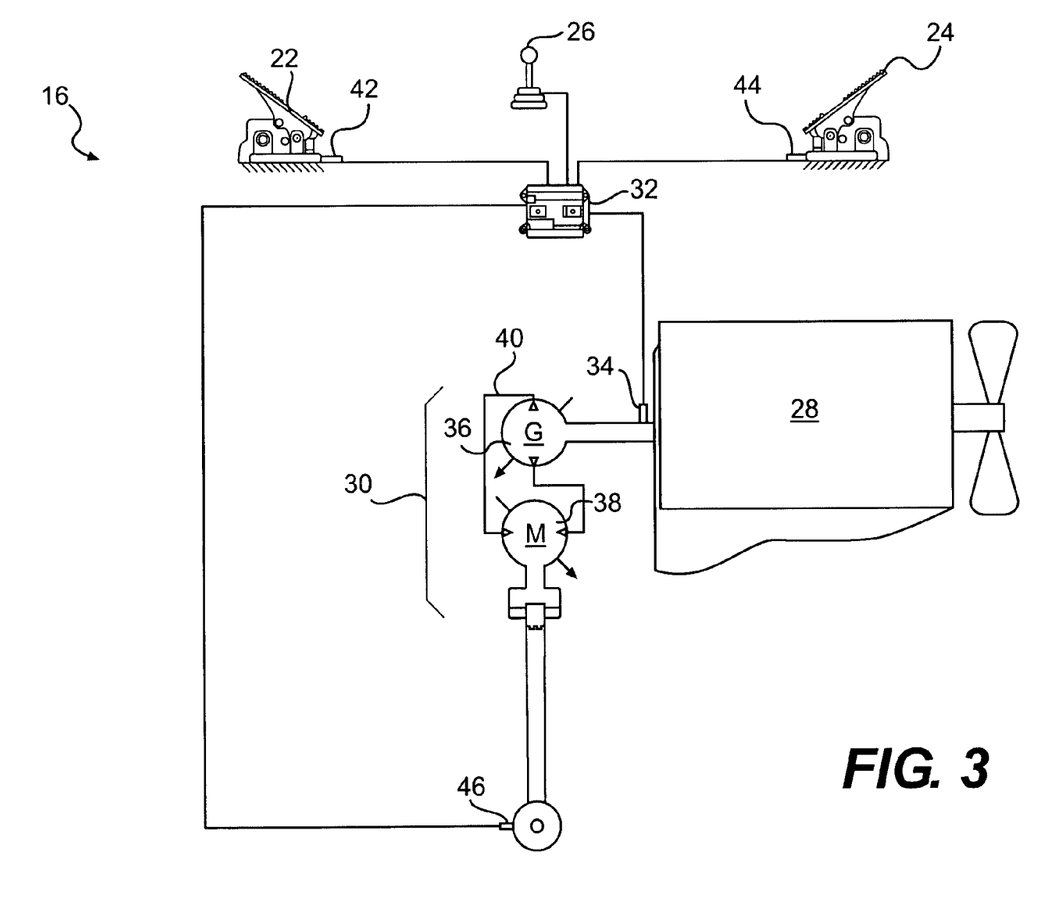
FIG. 3 is a diagrammatic illustration of an exemplary disclosed control system for use with the operator station of FIG. 2.

As illustrated in FIG. 3, power train 16 may be an integral package configured to generate and transmit power to traction devices 14. In particular, power train 16 may include a power source 28 operable to generate a power output, a transmission unit 30 connected to receive the power output and transmit the power output in a useful manner to traction devices 14 (referring to FIG. 1), and a control module 32 configured to regulate the operation of transmission unit 30 in response to one or more inputs.

Power source 28 may include an internal combustion engine having multiple subsystems that cooperate to produce mechanical or electrical power output. For the purposes of this disclosure, power source 28 is depicted and described as a four-stroke diesel engine. One skilled in the art will recognize, however, that power source 28 may be any other type of internal combustion engine such as, for example, a gasoline or a gaseous fuel-powered engine. The subsystems included within power source 28 may include, for example, a fuel system, an air induction system, an exhaust system, a lubrication system, a cooling system, or any other appropriate system.

A sensor 34 may be associated with power source 28 to sense an output speed thereof. In one example, sensor 34 may embody a magnetic pickup type of sensor associated with a magnet embedded within a rotational component of power train 16 such as a crankshaft or flywheel. During operation of power source 28, sensor 34 may sense the rotating magnetic field produced by the magnet and generate a signal corresponding to the rotational speed of power source 28.

Transmission unit 30 may embody, for example, a continuously variable transmission (CVT). Transmission unit 30 may be any type of continuously variable transmission such as, for example, a hydraulic CVT, a hydro-mechanical CVT, an electric CVT, or other configuration as would be apparent to one skilled in the art. In addition, transmission unit 30 may include a driving element 36 and a driven element 38.

In the exemplary electric CVT of FIG. 3, driving element 36 may be a generator, such as a three-phase permanent magnet alternating field-type generator, and driven element 38 may be an electric motor, such as permanent magnet alternating field-type motor configured to receive power from driving element 36. The generator of driving element 36 may be connected to drive the motor of driven element 38 with electric current via power electronics 40 in response to a torque command directed to driven element 38. In some situations, the motor of driven element 34 may alternatively drive the generator of driving element 36 in reverse direction via power electronics 40. It is contemplated that, in embodiments utilizing a hydraulic continuously variable transmission unit, driving element 36 may be a pump, such as a variable displacement pump, and driven element 38 may be a motor, such as a variable displacement motor. Driven element 38 may be fluidly connected to driving element 36 by conduits that supply and return fluid to and from driving element 36 and driven element 38, allowing driving element 36 to effectively drive driven element 38 by fluid pressure.

Power electronics 40 may include generator associated components and motor associated components. For example, power electronics 40 may include one or more drive inverters (not shown) configured to invert three-phase alternating power to direct phase power and vice versa. The drive inverters may have various electrical elements including insulated gate bipolar transistors (IGBTs), microprocessors, capacitors, memory storage devices, and any other similar elements used for operating driving element 36 and driven element 38. Other components that may be associated with the drive inverter include power supply circuitry, signal conditioning circuitry, and solenoid driver circuitry, among others. In addition, power electronics 40 may include a generator heat sink (not shown), and a motor heat sink (not shown) in communication with driving and driven elements 36, 38, respectively. Each heat sink may absorb heat from their respective components of power electronics 40 and transfer this heat to a cooling system (not shown).

Transmission unit 30 may be at least partially controlled with left and right foot pedals 22 and 24. That is, as left and right foot pedals 22 and 24 are manipulated by an operator, the foot pedals may provide electric signals signifying a desired driven element output such as, for example, a desired torque output and/or a desired speed limit. For example, left and right foot pedals 22 and 24 may have a minimum position and be movable through a range of positions to a maximum position. Sensors 42 and 44 may be provided in association with each of left and right foot pedals 22 and 24, respectively, to sense the displacement positions thereof and produce corresponding signals responsive to the displaced positions. Sensors 42 and 44 may be any sensor capable of sensing the displacement of foot pedals 42 and 44 such as, for example, a switch or potentiometer. The displacement signals from each of sensors 42 and 44 may be directed through control module 32 to transmission unit 30 to control the torque output of driven element 38.

A sensor 46 may be associated with transmission unit 30 and/or traction device 14 (referring to FIG. 1) to sense a travel speed of machine 10. In one example, sensor 46 may embody a magnetic pickup type of sensor associated with a magnet embedded within a rotational component of power train 16 such as a transmission output shaft. During operation of machine 10, sensor 46 may sense the rotating magnetic field produced by the magnet and generate a signal corresponding to the rotational speed of transmission unit 30 and/or the corresponding travel speed of machine 10.

Control module 32 may embody a single microprocessor or multiple microprocessors for controlling the operation of power train 16 in response to the received signals. Numerous commercially available microprocessors can be configured to perform the functions of control module 32. It should be appreciated that control module 32 could readily embody a general machine microprocessor capable of controlling numerous machine functions. Control module 32 may include a memory, a secondary storage device, a processor, and any other components for running an application. Various other circuits may be associated with control module 32 such as power supply circuitry, signal conditioning circuitry, solenoid driver circuitry, and other types of circuitry.

A plurality of base control maps may be stored within the memory of control module 32 and may be grouped together based on a transmission operating mode. For example, the base control maps may be divided into forward, neutral, and reverse groups. Such groups may be selected in response to a signal indicative of a position of FNR selector 26. In addition, each base map may include a plurality of sub-maps. Each of these base maps and sub-maps may be in the form of tables, graphs, and/or equations and include a compilation of data collected from lab and/or field operation of power train 16.

Figure 4:
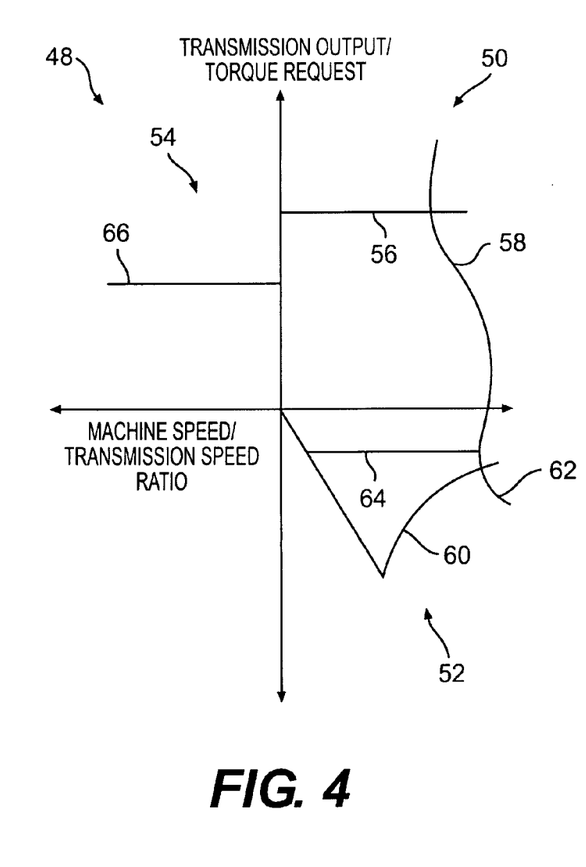
FIG. 4 is an exemplary disclosed control map for use with the control system of FIG. 3.

FIG. 4 illustrates an exemplary forward base control map 48 having a plurality of sub-maps, which may be utilized by control module 32 when FNR selector 26 is set to a forward position. Forward base control map 48 may include a propulsion sub-map 50 controlling a forward propulsion of machine 10, a retarding sub-map 52 controlling a retarding of the forward propulsion, and a directional shift sub-map 54 controlling a backward speed of machine 10. Furthermore, each sub-map may have an x-axis (independent axis) representing either a machine speed or a transmission ratio and a y-axis (dependent axis) representing either a transmission output or a torque request. It is contemplated that each sub-map may include limits for torque, machine speed, and/or propulsion power. For example, propulsion sub-map 50 may include a maximum torque limit 56 and a maximum speed limit 58. In addition, retarding sub-map 52 may include a maximum retarding force limit 60, a maximum speed limit 62, and a maximum coasting retarding force 64. Furthermore, directional shift sub-map 54 may include a maximum torque limit 66. It should be understood that although the limits for torque, machine speed, and propulsion power are illustrated as continuous curves or lines, the limits may be discontinuous. In addition, it is contemplated that each sub-map may include additional limits that are not illustrated in FIG. 4, if desired.

Figure 5:
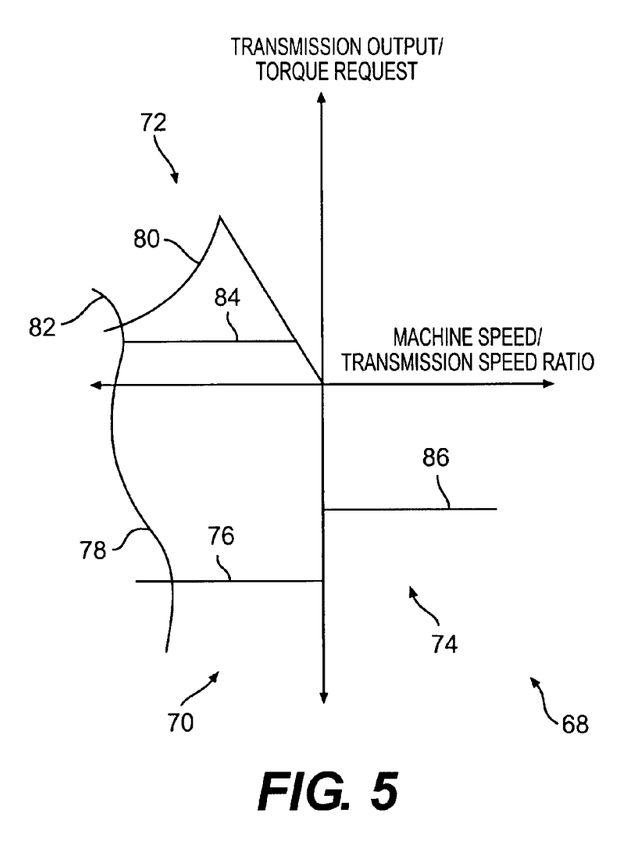
FIG. 5 is an exemplary disclosed control map for use with the control system of FIG. 3.

FIG. 5 illustrates an exemplary reverse base control map 68 having a plurality of sub-maps, which may be utilized by control module 32 when FNR selector 26 is set to a reverse position. Reverse base control map 68 may include a propulsion sub-map 70 controlling a backward propulsion of machine 10, a retarding sub-map 72 controlling a retarding of the backward propulsion, and a directional shift sub-map 74 controlling a forward speed of machine 10. Similar to the forward sub-maps, each reverse sub-map may have an x-axis (independent axis) representing either a machine speed or a transmission ratio and a y-axis (dependent axis) representing either a transmission output or a torque request. In addition, it is contemplated that each sub-map may include limits for torque, machine speed, and/or propulsion power. For example, propulsion sub-map 70 may include a maximum torque limit 76 and a maximum speed limit 78. In addition, retarding sub-map 72 may include a maximum retarding force limit 80, a maximum speed limit 82, and a maximum coasting retarding force 84. Furthermore, directional shift sub-map 74 may include a maximum torque limit 86. It should be understood that although the limits for torque, machine speed, and propulsion power are illustrated as continuous curves or lines, the limits may be discontinuous. In addition, it is contemplated that each sub-map may include additional limits that are not illustrated in FIG. 5, if desired.

The base control maps stored in the memory of control module 32 may be modified so that the dependent variables represented on the y-axis such as, for example, maximum torque limit 56, maximum coasting retarding force 64, maximum torque limit 66, maximum torque limit 76, maximum coasting retarding force 84, and maximum torque limit 86 may be shifted and/or scaled. Such modifications may be based on net displacement values applied to various algorithms, maps, charts, and/or graphs. The net displacement values may be determined from one of a plurality of net displacement maps stored in the memory of control module 32. Each of these net displacement maps may be in the form of tables, graphs, and/or equations and include a compilation of data collected from lab and/or field operation of power train 16.

Figure 6:
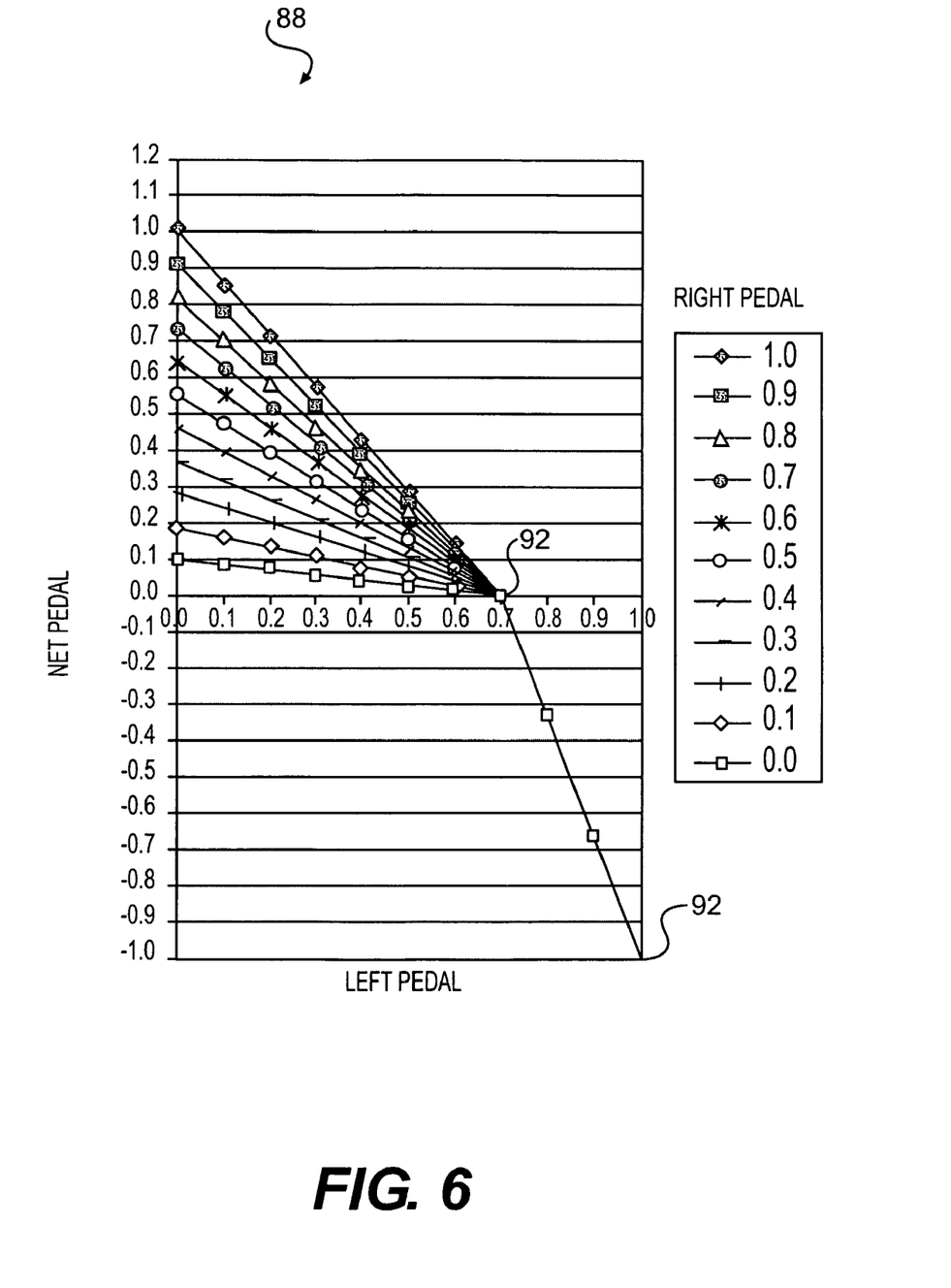
FIG. 6 is an exemplary disclosed control map for use with the control system of FIG. 3.
Figure 7:
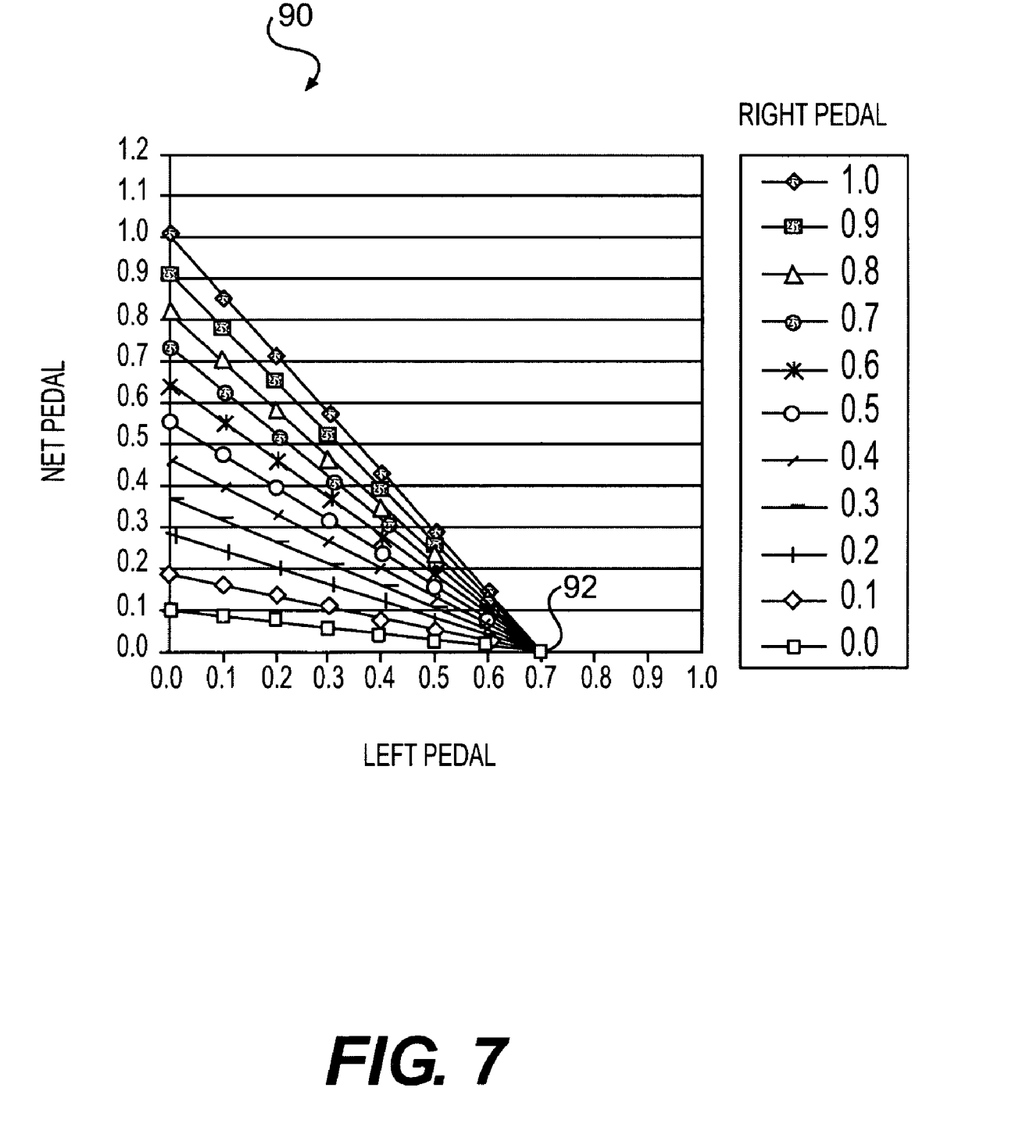
FIG. 7 is an exemplary disclosed control map for use with the control system of FIG. 3.

FIGS. 6 and 7 illustrate exemplary net displacement maps 88 and 90, respectively. In each of these maps, the left pedal displacement may form one coordinate axis that, together with various right pedal displacement curves, may be used to determine a net displacement value. The net displacement maps stored in the memory of control module 32 may vary in any number of ways. For example, the shapes of the right pedal displacement curves may be either linear or non-linear. In addition, different net displacement maps may terminate the right pedal curves at different locations on the Y-axis. Furthermore, the net displacement maps may include tunable points 92, which may be located at any left pedal displacement value. Such variations may generate different responses to operator inputs. For example, a net displacement map may generate a torque request signal requesting a torque output having a magnitude of zero (a zero net displacement value) when the retarding signal generated by the displacement of left pedal 22 equals the propulsion signal generated by the displacement of right pedal 24. If net displacement map 88 is referenced, the displacement of left pedal 22 needed to generate the zero net displacement value may be independent of the displacement of right pedal 24. Alternatively, if net displacement map 90 is referenced, the displacement of left pedal 22 needed to generate the zero net displacement value may increase as the displacement of right pedal 24 increases.

Each net displacement map may be associated with one or more sub-maps. For example, net displacement map 88 may be associated with sub-maps 50 and 52 and may be used to shift and/or scale maximum torque limit 56 and maximum coasting retarding force 64. Additionally, the net displacement value determined from net displacement map 88 may be applied to various algorithms, maps, charts, and/or graphs and used to regulate a torque or speed output of transmission unit 30 when control module 32 is following a control path in sub-maps 50 or 52. Alternatively, net displacement map 90 may be associated with sub-map 54 and may be used to shift and/or scale maximum torque limit 66. Additionally, the net displacement value determined from net displacement map 90 may be applied to various algorithms, maps, charts, and/or graphs and used to regulate a torque or speed output of transmission unit 30 when control module 32 is following a control path in sub-map 54.

Figure 8:
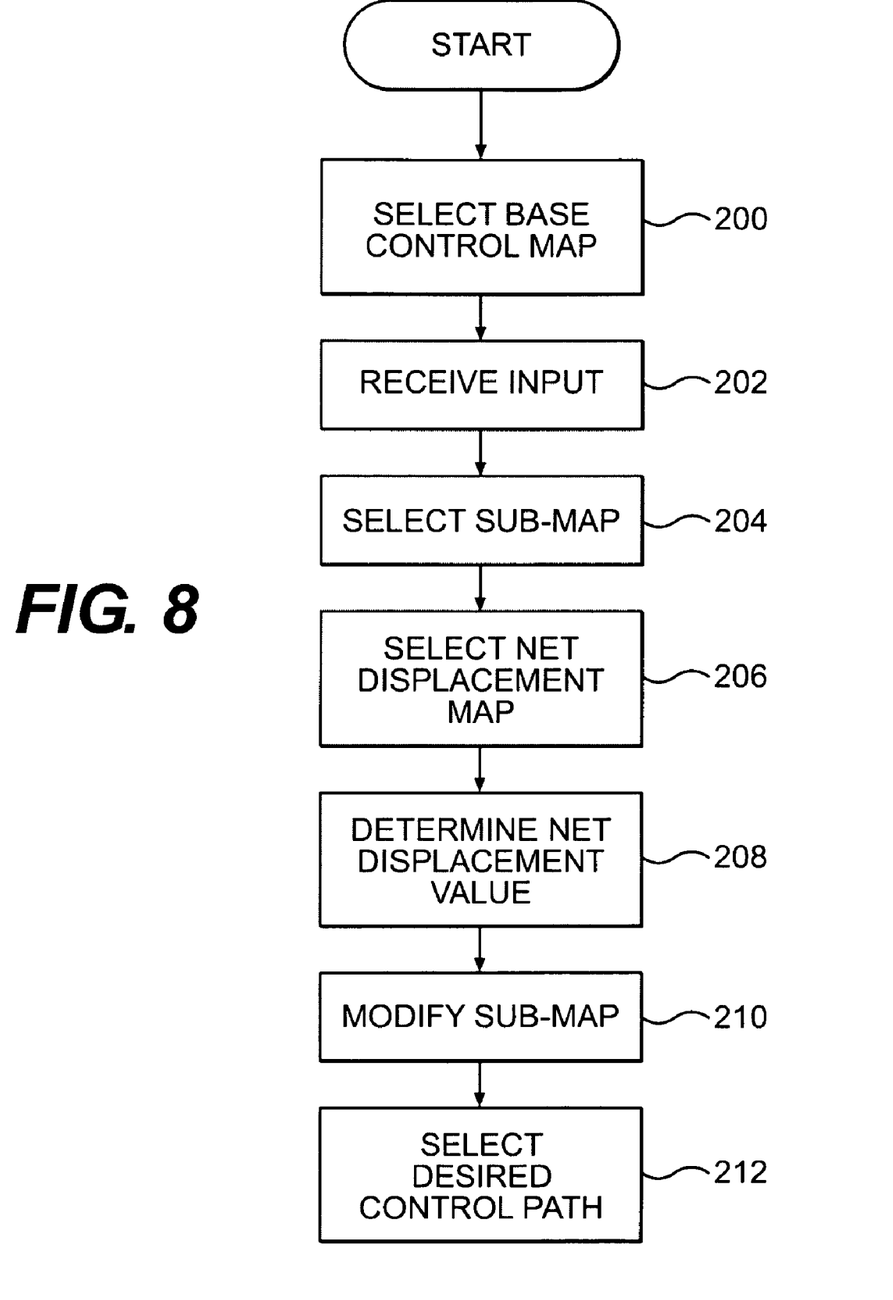
FIG. 8 is a flowchart depicting an exemplary method of operating the control system of FIG. 3.
Figure 9:
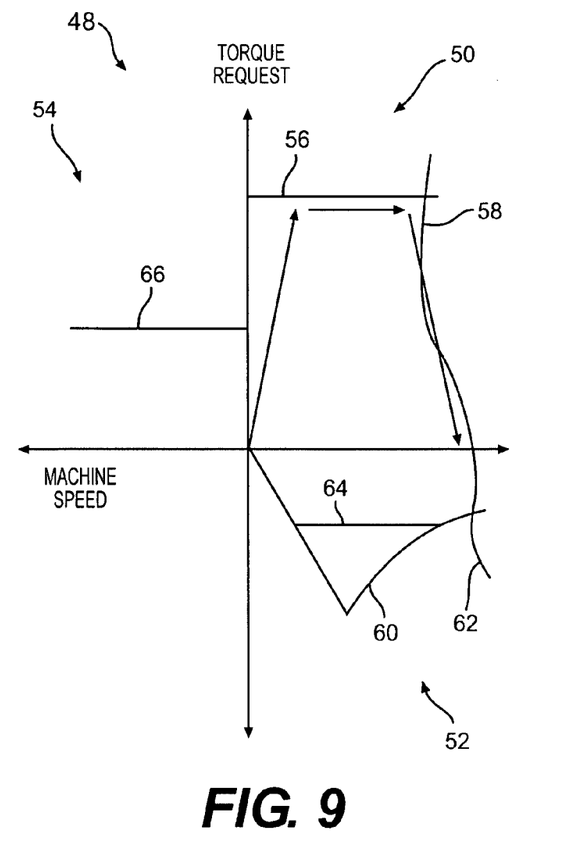
FIG. 9 is an exemplary disclosed control map for use with the control system of FIG. 3.

FIGS. 8 and 9 illustrate an exemplary method of controlling the output of transmission unit 30. In particular, FIG. 8 is a flow chart representing an exemplary method for selecting and modifying an appropriate sub-map for controlling transmission unit 32 in response to different operator actions. In addition, FIG. 9 is a graphical representation depicting an exemplary path that an operator request may take once the appropriate sub-map has been selected and modified. FIGS. 8 and 9 will be discussed further in the following section to better illustrate the disclosed system and its operation.

INDUSTRIAL APPLICABILITY

The disclosed control system may be applicable to any vehicle having a torque controlled CVT. In particular, by selecting a particular base control map from a plurality of base control maps and a particular sub-map from a plurality of sub-maps in response to multiple inputs, the control system may efficiently and accurately determine a desired torque output that the transmission may follow under various environmental and vehicular conditions. The selection of a base control map, an associated sub-map, and an ensuing control path for an output request will be described below.

As illustrated in FIG. 8, the method may begin when control module 32 selects an appropriate base map according to input signals received from the operator (step 200). Such signals may be generated when the operator sets FNR selector 26 to a desired position. For example, if the operator sets FNR selector 26 to a forward position, a signal indicative of the forward position may be transmitted from FNR selector 26 to control module 32 either wirelessly or via a communication line. Upon receiving the signal, control module 32 may select forward base control map 48. It is contemplated that the selection of the base control map may be made independent of operator input, if desired. In such an embodiment, control module 32 may select a base control map based on other input factors such as, for example, a direction of an engine countershaft rotation, direction of rotation of traction devices 14, or any other parameter indicative of a direction of vehicular movement or idle condition.

After a base control map has been selected, control module 32 may receive input from a plurality of sources (step 202). Such input may include the displacement of left foot pedal 22 received via sensor 42, the displacement of right foot pedal 24 received via sensor 44, the output speed of power source 28 received via sensor 34, and the output speed of transmission unit 30/traveling speed of machine 10 received via sensor 46.

After receiving the input, control module 32 may select an appropriate sub-map based on the selected base map and the received input (step 204). For example, if base map 48 has been selected, the appropriate sub-map may be one of sub-maps 50, 52, and 54 because those sub-maps may be the only sub-maps associated with base map 48. Control module 32 may reference the received input to determine which of the above-mentioned sub-maps may be appropriate for the current conditions of machine 10. For example, if machine 10 is currently traveling at a positive speed and transmission unit 30 is generating a negative torque, control module 32 may select sub-map 52. Alternatively, if machine 10 is at a standstill and transmission unit 30 is generating zero torque, control module may reference the displacement of left pedal 22 or right pedal 24. If right pedal 24 is displaced, control module 32 may select sub-map 50. If left pedal 22 is displaced, control module 32 may select sub-map 52. It is contemplated that other sources of input may be relied upon when determining the appropriate sub-map, if desired.

After selecting the appropriate sub-map, control module 32 may select an appropriate net displacement map (step 206). In particular, because each sub-map may be associated with a particular net displacement map, the appropriate net displacement map may be selected based on the selected sub-map. For example, if either sub-map 50 or 52 are selected, net displacement map 88 may be selected because both sub-maps may be associated with net displacement map 88.

Once the appropriate net displacement map is selected, signals from sensors 42 and 44 indicative of the displacements of left and right foot pedals, respectively, may be used to determine a net displacement value (step 208). That is, upon receiving the displacement signals from sensors 42 and 44, control module 32 may reference net displacement map 88 (if either sub-maps 50 or 52 have been selected) and select a corresponding net displacement value. For example, if an operator of machine 10 depressed right pedal 24 about 70% of the distance from the neutral position toward the maximum position of right pedal 24, and depressed left pedal 22 about 30% of the distance from the neutral position toward the maximum position of left pedal 22, the right and left pedal values would be approximately 0.7 and 0.3, respectively. Following the right pedal curve corresponding to 0.7 to the intersection with 0.3 along the horizontal axis of the FIG. 6 control map, the net displacement value can be taken from the vertical axis as 0.4.

After determining the net displacement value, the selected sub-map may be modified (step 210). For example, the determined net displacement value may be applied to algorithms, charts, and/or graphs, which may increase or decrease the maximum torque limit associated with the sub-map. After the sub-map has been modified, control module 32 may determine a desired control path that transmission unit 30 may follow (step 212).

FIG. 9 illustrates an exemplary control map, which may be selected after performing the method disclosed above. In the example, machine 10 may be at a standstill, and control module 32 may select sub-map 50 and net displacement map 88 according to the method disclosed above. In addition, net displacement map 88 may generate a positive net displacement value indicating a desire to propel machine 10 in a forward direction.

Control module 32 may apply the net displacement value to algorithms, maps, charts, and/or graphs to determine a torque output request. After receiving the torque output request, control module 32 may increase the torque output of transmission unit 30. While increasing the torque, control module 32 may continuously compare the torque output to maximum torque limit 56, that may have been previously shifted and/or scaled in response to the net displacement value. If the output torque of transmission 30 is less than maximum torque limit 56, control module 32 may continue increasing the torque output per the torque output request generated by the net displacement value. If the output torque is equivalent to maximum torque limit 56, control module 32 may maintain the current magnitude of the output torque.

While maintaining the output torque at a constant level, control module 32 may continuously compare the speed of machine 10 to maximum speed limit 58. If the speed of machine 10 is less than maximum speed limit 58, control module 32 may maintain the magnitude of the output torque. However, if the speed of machine 10 is equal to maximum speed limit 58, control module 32 may reduce the output torque to maintain the speed of machine 10 at maximum speed limit 58. Similar to maximum torque limit 56, maximum speed limit 58 may be shifted or scaled in response to input from operator interface devices 18 or may be built into the control strategy algorithm.

Because the disclosed control system may interpret multiple inputs to determine a desired combination of base control maps and sub-maps, the flexibility of the control system may be increased. In addition, the use of combinations of control maps to create a desired control path may increase the number of possible control paths beyond the number of available maps, increasing the flexibility of the system. Such flexibility may increase the variety of environments and applications for which the transmission and ultimately the associated machine may be used.

It will be apparent to those skilled in the art that various modifications and variations can be made to the disclosed control system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A continuously variable transmission, comprising:
 a driven element;
 a first operator input device configured to transmit a first displacement signal corresponding to a displacement of the first operator input device;
 a second operator input device configured to transmit a second displacement signal corresponding to a displacement of the second operator input device;
 a third operator input device configured to transmit a transmission operating mode request;
 at least one sensor configured to sense at least one parameter indicative of an operating condition of the transmission; and
 a controller configured to:
  determine a driven element output request based on the operating request mode, the first displacement signal, the second displacement signal, and the at least one sensed parameter;
  regulate an output of the driven element in response to the operating mode request, the driven element output request, and the at least one sensed parameter; and
  generate a net displacement value based on the operating mode request and one of a plurality of relationships between the displacement of the first operator input device and the displacement of the second operator input device.

2. The continuously variable transmission of claim 1, wherein the controller includes a plurality of base maps stored in the memory thereof, each base map being related to an operating mode of the transmission.

3. The continuously variable transmission of claim 2, wherein the controller is configured to select a base map in response to the transmission mode request.

4. The continuously variable transmission of claim 3, wherein each base map includes a plurality of sub-maps.

5. The continuously variable transmission of claim 4, wherein the controller is configured to select a sub-map in response to the driven element output request and the at least one sensed parameter indicative of an operating condition of the transmission.

6. The continuously variable transmission of claim 5, wherein the controller is configured to generate the net displacement value based on one of the plurality of sub-maps and the one of the plurality of relationships between the displacement of the first operator input device and the displacement of the second operator input device.

7. The continuously variable transmission of claim 6, wherein each of the relationships between the displacement of the first operator input device and the displacement of the second operator input device is associated with one or more sub-maps.

8. The continuously variable transmission of claim 7, wherein the controller is configured to generate a driven element output request based on the net displacement value.

9. The continuously variable transmission of claim 8, wherein each sub-map includes at least one limitation curve limiting the driven element output, and the controller is configured to modify each limitation curve based on the net displacement value.

10. A method of operating a transmission, comprising:
 receiving an operating mode request;
 receiving a first operator input device displacement signal;
 receiving a second operator input device displacement signal;
 sensing at least one parameter indicative of an operating condition of the transmission;
 determining a transmission output request in response to the operating mode request, the first operator input device displacement signal, the second operator input device displacement signal, and the at least one parameter;
 controlling an output of the transmission in response to the operating mode request, the determined transmission output request, and the at least one parameter; and
 generating a net displacement value based on the operating mode request and one of a plurality of relationships between the first operator input device displacement signal and the second operator input device displacement signal.

11. The method of claim 10, further including determining the transmission output request based on the net displacement value.

12. The method of claim 11, further including limiting the transmission output based on the net displacement value.

13. A machine, comprising:
 a power source configured to generate a power output;
 at least one traction device configured to propel the machine;
 an operator station configured to receive input from an operator indicative of a desired machine movement; and
 a continuously variable transmission, including:
  a driven element;
  a first operator input device configured to transmit a first displacement signal corresponding to a displacement of the first operator input device;
  a second operator input device configured to transmit a second displacement signal corresponding to a displacement of the second operator input device;
  a third operator input device configured to transmit a transmission operating mode request;
  at least one sensor configured to sense at least one parameter indicative of an operating condition of the transmission; and
  a controller configured to:
   determine a driven element output request based on the operating request mode, the first displacement signal, the second displacement signal, and the at least one sensed parameter;
   regulate an output of the driven element in response to the operating mode request, the driven element output request, and the at least one sensed parameter; and
   generate a net displacement value based on the operating mode request and one of a plurality of relationships between the displacement of the first operator input device and the displacement of the second operator input device.

14. The machine of claim 13, wherein the controller includes a plurality of base maps stored in the memory thereof, each base map being related to an operating mode of the transmission and including a plurality of sub-maps.

15. The machine of claim 14, wherein the controller is configured to select a base map in response to the transmission mode request and select a sub-map in response to the driven element output request and the at least one sensed parameter indicative of an operating condition of the transmission.

16. The machine of claim 15, wherein the controller is configured to generate the net displacement value based on one of the plurality of sub-maps and the one of the plurality of relationships between the displacement of the first operator input device and the displacement of the second operator input device.

17. The machine of claim 16, wherein each of the relationships between the displacement of the first operator input device and the displacement of the second operator input device is associated with one or more sub-maps.

18. The machine of claim 17, wherein the controller is configured to generate a driven element output request based on the net displacement value.

19. The machine of claim 18, wherein each sub-map includes at least one limitation curve limiting the driven element output, and the controller is configured to modify each limitation curve based on the net displacement value.

* * * * *